No. 863,745. PATENTED AUG. 20, 1907.
E. D. NELSON & W. L. BROWN.
HOSE PIPE COUPLING END.
APPLICATION FILED FEB. 20, 1906.
3 SHEETS—SHEET 1.
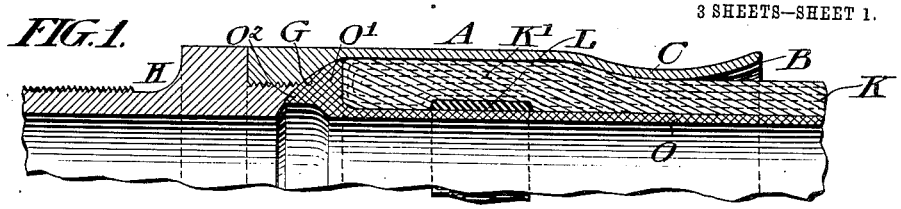
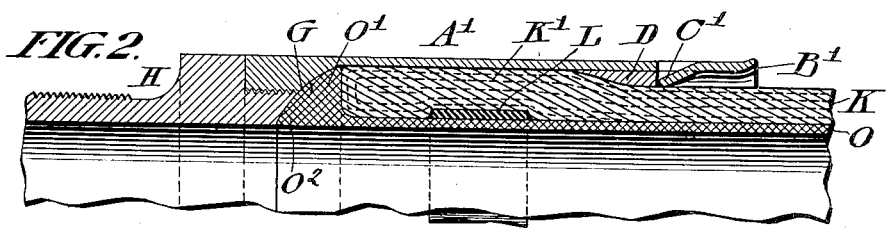
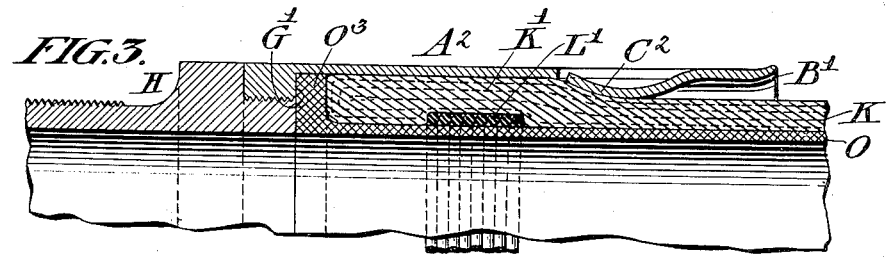
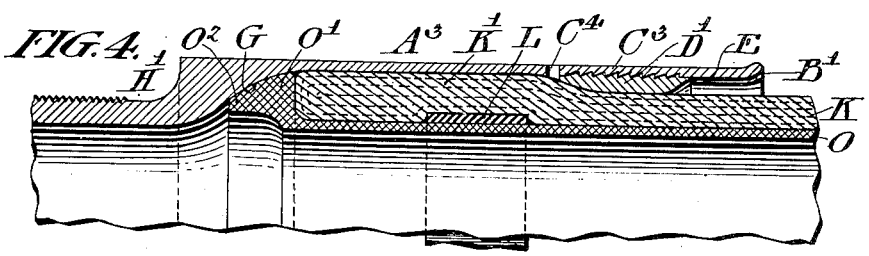
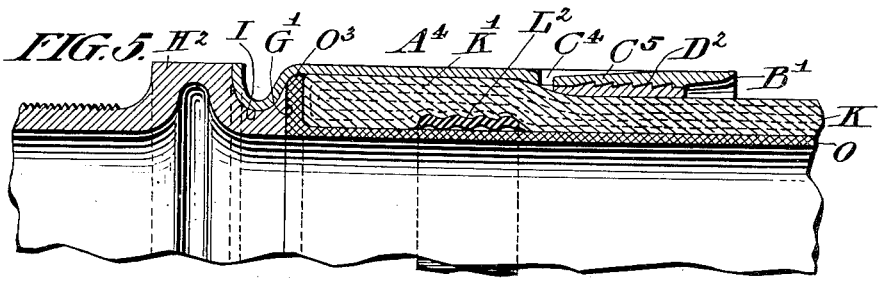
WITNESSES:
INVENTORS
ATTORNEY.

No. 863,745. PATENTED AUG. 20, 1907.
E. D. NELSON & W. L. BROWN.
HOSE PIPE COUPLING END.
APPLICATION FILED FEB. 20, 1906.
3 SHEETS—SHEET 2.
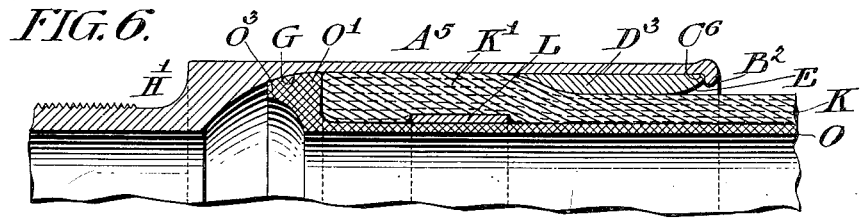
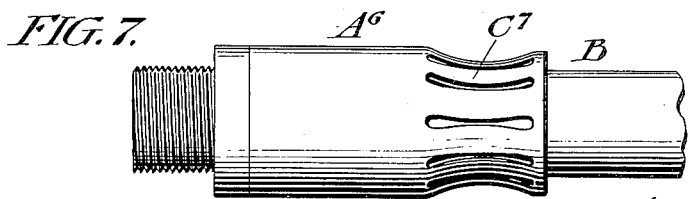
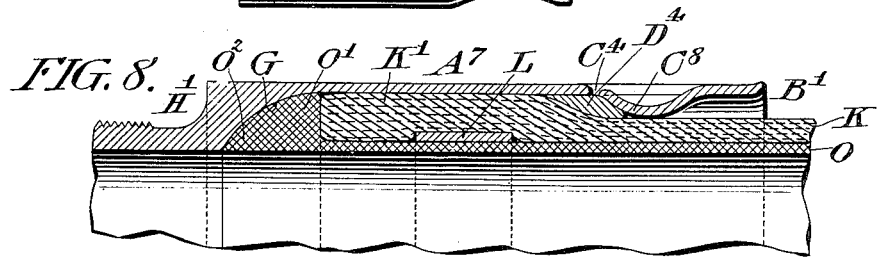
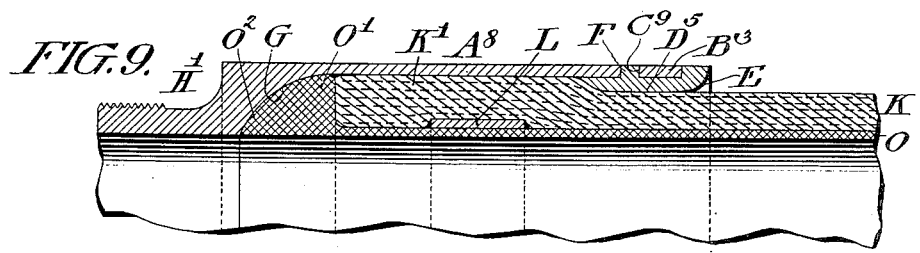
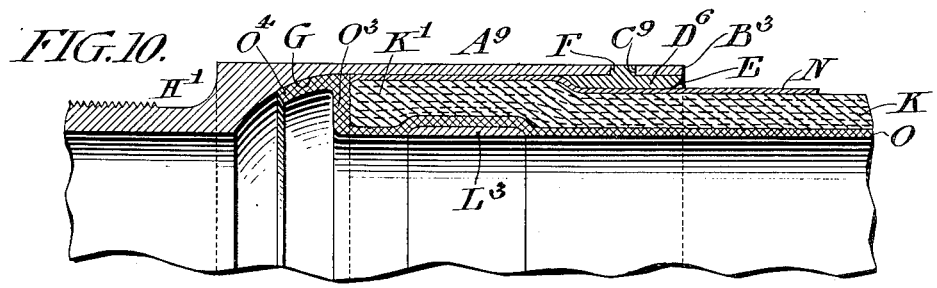
WITNESSES:
INVENTORS
ATTORNEY.

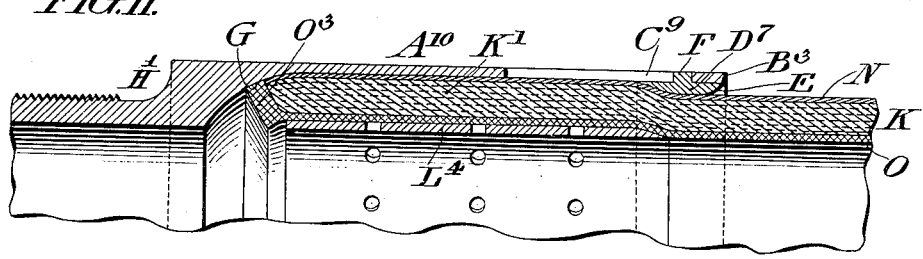
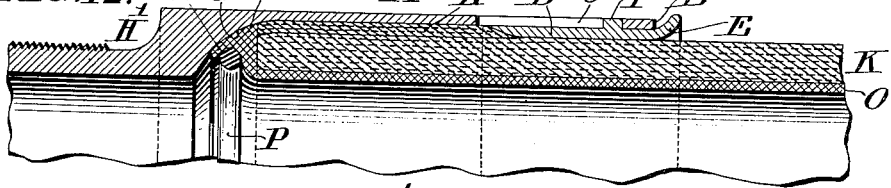
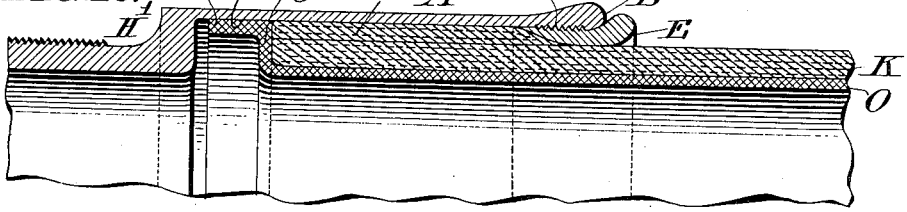
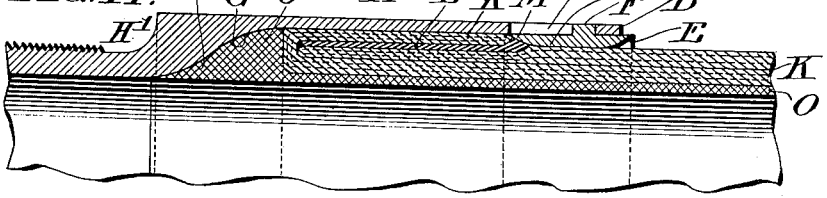
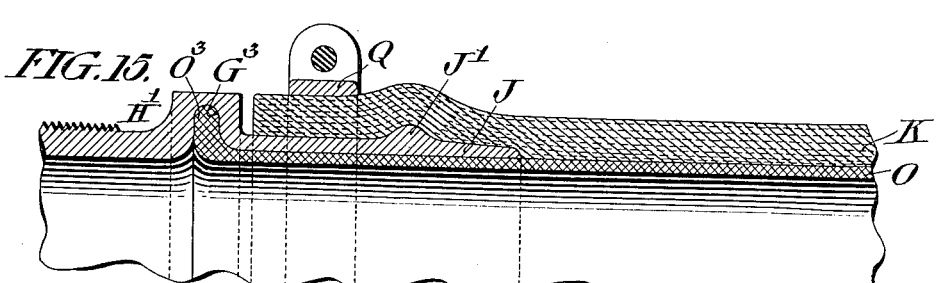

UNITED STATES PATENT OFFICE.

EDWARD D. NELSON AND WILLIAM L. BROWN, OF ALTOONA, PENNSYLVANIA.

HOSE-PIPE-COUPLING END.

No. 863,745.

Specification of Letters Patent.

Patented Aug. 20, 1907.

Application filed February 20, 1906. Serial No. 302,014.

*To all whom it may concern:*

Be it known that we, EDWARD D. NELSON and WILLIAM L. BROWN, both citizens of the United States of America, residing in Altoona, in the county of Blair and State of Pennsylvania, have invented a certain new and useful Improvement in Hose-Pipe-Coupling Ends, of which the following is a true and exact description, reference being had to the accompanying drawings, which form a part thereof.

Our invention relates to hose pipes, particularly such as are used for coupling the air and steam pipes of railway cars, and has for its object to provide improved means for securing the ends of the flexible non-metallic hose sections to the metallic coupling ends.

The particular form of the body of the hose sections disclosed herein, in which the hose is formed of the inner rubber tube entirely disconnected from the fabric outer portion is novel with us, and forms the subject of our copending application, Serial Number 302,013, filed February 20, 1906, but the present invention relates simply to the construction of the ends of the hose and the metallic connections secured thereto and this invention is capable of use with hose sections having body portions formed in any usual manner.

One feature of our present invention consists in extending the inner rubber tube into a tubular socket of the metallic coupling end so that a flexible end of the rubber tube will seal against the sides of the metallic coupling and, under pressure of the air, form a tight joint therewith, and another feature of our invention consists in forming the hose with an enlarged end which is inserted in a tubular socket of the metallic coupling piece and secured in place therein by means attached to the mouth of the tubular socket and abutting against the inner edge of the enlarged hose end.

Our invention will be best understood, as well as its various practical modifications, as described in connection with the drawings in which it is illustrated, and in which Figures 1 to 16 are each central sectional views of couplings constructed in accordance with our invention and differing from each other in various details.

A, Fig. 1, indicates the socket piece of the coupling, the threaded shank H of which, as in Figs. 1, 2 and 3, is made separate from the socket and secured thereto by a screw thread. The mouth of the socket is preferably flared, as indicated at B, the socket being pressed inward at C, to form the retaining shoulder abutting against the inner edge of the head on the hose. The rear of the socket is curved in a substantially spherical segment, as indicated at G.

K, indicates the outer fabric of the hose which forms in effect a strengthening tubular jacket or casing surrounding the inner rubber tube or lining O which is continued beyond the fabric strengthening tubes K, in the form of an annular head indicated at $O^1$, this head being formed with a flexible lip $O^2$, which fits against the rounded portion G, of the socket. The fabric K is formed with an enlarged head as indicated at $K^1$, the head being made substantially unyielding by means of a metal ring L. In this construction the enlarged head of the hose is slipped into the socket to the position shown and the outer end of the socket then spun down, as indicated at C. The air pressure, when let into the hose, will press the annular head $O'$, against the end of the strengthening tube and press its flexible end $O^2$, against the rounded portion G, of the socket insuring a tight and secure joint.

In the construction shown in Fig. 2, the socket, here indicated at $A'$, has spring tongues $C'$, cut in it and pressed inward as shown, a bell mouth $B'$, being formed beyond the tongues on the end of the socket and, in this construction, the enlarged head of the hose is locked in place by means of wedges D, forced into the mouth of the socket beyond the spring tongues after the hose is in place.

In Fig. 3 the strengthening ring, indicated at $L'$, is made of coiled wire and the end of the inner rubber tube O, is shown as having a square shoulder $O^3$, fitting into a squared recess $G'$, at the end of the socket. The hose in this construction is retained by spring tongues $C^2$, cut and pressed inward from the end of the socket piece $A^2$.

In Fig. 4, the screw end of the socket is shown as formed integral with the socket piece $A^3$, and a portion of the outer end of the socket piece, indicated at $C^3$, is made with teeth to engage with wedge blocks $D'$, which are forced in to lock the hose head in position. In this construction an opening $C^4$, is provided in the rear of the teeth portion $C^3$, through which a tool can be introduced to force the locking pieces out.

In Fig. 5 the threaded portion of the socket, indicated at $H^2$, is attached to the socket, here indicated at $A^4$, by spinning the end of the socket into a cavity in the threaded portion $H^2$, as shown at I. The strengthening ring is here indicated at $L^2$, and consists of a corrugated plate and the retaining wedges, here shown at $D^2$, are secured in place by spring tongues $C^5$, cut from the end of the socket and notched to engage with similar notches on the retaining wedges.

In Fig. 6 the socket piece, indicated here at $A^5$, is provided with inwardly hooked ends $C^6$, bell flared on the outside, as indicated at $B^2$, the retaining wedges $D^3$, being forced in beyond the hooked edge $C^6$ as shown.

In the construction indicated in Fig. 7 the hose is held in place substantially as in Fig. 1 except that the inwardly spun portion, here indicated at $C^7$, is slotted to make the compression of the socket easier.

In Fig. 8 spring tongues $C^8$, are formed from the metal of the socket, wedges $D^4$, being forced past these spring tongues and locked in position as shown.

In Fig. 9, slots $C^9$, are formed in the end of the socket piece A⁸, the ends of which, shown at B³, are here squared; wedge pieces D⁵, provided with lugs F, are forced in, the lugs engaging in the groove C⁹, and the desirable flare at the mouth of the socket is provided by flaring the end of the wedge pieces, as shown at E.

In Fig. 10 the socket A⁹, does not differ substantially from the socket A⁸, of Fig. 9; the wedge pieces D⁶, are secured in position in the same way but do not extend outward beyond the end of the socket pieces, their flared ends E, lying within the socket. In this construction the strengthening ring, here shown at L³, lies inside of the rubber tube O, and we have also indicated at N, an outer protecting jacket on the fabric tube A. We also show in connection with the squared end O³, of the inner tube a longitudinally extending annular flap O⁴, adapted to abut against the curved end G, of the socket.

In Fig. 11, socket A¹⁰, is very similar in construction to the socket in Fig. 10, except that the slot C⁹, is made longer, the wedge piece D⁷, having a comparatively short lug F. In this construction a broad perforated ring L⁴, is used in much the same way as the ring L³, of Fig. 10.

In Fig. 12, the construction of the socket A¹¹, is much the same as that of the socket in Fig. 11, the wedge piece D⁸, being shown longer however and provided with an outwardly flared bell mouth E, extending considerably beyond the end B³, of the socket. The enlarged end K′, of the hose is here shown without any strengthening ring and positive contact of the flap O², of the inner tube with the socket base G is insured by a spring P.

In Fig. 13 the socket piece, here indicated at A¹², is formed with a square base G², similar to the base G′, of Fig. 3, except that it is longer. The projecting end of the inner rubber tube is formed with the flange O³, and flap O⁴, as in Fig. 10, the flap fitting up against the outer portion of the socket end G², as shown. The retaining device in this construction is a threaded ring D¹⁰, screwing into the threaded end B⁴, of the socket and having a flared outwardly projecting edge E.

In the construction shown in Fig. 14, the outer layers of the tubular structure K are turned over a metal strengthening ring L⁵, as shown. In other respects the construction is similar to some of those already described.

In Fig. 15 the threaded coupling end is formed with an annular recess G³, the socket piece, here indicated at J, is formed with an outer beading J′; the inner rubber tube is introduced into the socket piece and is formed with a flanged end O³ which fits in the socket G³, while the outer strengthening tube K is forced over the socket piece and its end secured in place by a clamping ring Q.

In the construction of Fig. 16 the only novelty consists in the use of the strengthening ring L⁶, made of coiled wire and situated near the inner edge of the head.

In all forms disclosed by the drawings except those of Figs. 10 and 11, the stiffening ring surrounds the rubber inner portion of the hose, the hose thus having a non-metallic internally exposed portion extending throughout its length. By this arrangement we avoid the expansion over a strengthening ring of the inner rubber portion and the consequent compression of this portion between said ring and the coupling socket. Such expansion and compression we have found is liable to injure the rubber portion when the coupling ends are initially secured in place, and in any event it causes the portion of the rubber distorted to deteriorate more rapidly than it does when the inner rubber portion is within the strengthening ring and internally exposed throughout the length of the tube.

Having now described our invention, what we claim as new and desire to secure by Letters Patent is

1. A hose pipe having an essentially non-metallic body and enlarged end head and having a non-metallic internally exposed portion throughout its length, in combination with a coupling socket adapted to receive and inclose said enlarged end head and provided with means at its outer end which abut against the inner edge of said head.

2. A hose pipe having an essentially non-metallic body and enlarged end head and having a non-metallic internally exposed portion throughout its length, in combination with a coupling socket adapted to receive and inclose said enlarged end head and provided with retractable means at its outer end which abut against the inner edge of said head.

3. A hose pipe having an essentially non-metallic body and enlarged end head and having a non-metallic internally exposed portion throughout its length, in combination with a coupling socket adapted to receive and inclose said enlarged end head and locking blocks adapted to enter the mouth of the coupling socket after the hose head is in place therein, said blocks and the socket mouth having means for interengagement.

4. A substantially non-metallic flexible hose, consisting of an air tight inner tube and fabric outer jacket, said outer jacket having thickened end head portions, each incorporating a metallic ring surrounding the inner tube.

5. A substantially non-metallic flexible hose, consisting of an air tight inner non metallic tube internally exposed throughout its length, and a fabric outer jacket having a thickened end head, in combination with a coupling socket adapted to receive and inclose said enlarged head and provided with means at its outer end which abut against the inner edge of said enlarged head.

6. A hose pipe of yielding material having an enlarged end head, in combination with a coupling socket member adapted to receive and inclose said enlarged end head, and one or more segmental locking block members adapted to enter the mouth of the coupling socket after the hose head is in place, one of said members being provided with a socket or recess and the other of said members with a cooperating lug or projection entering said socket or recess when the locking member is in place.

7. A hose pipe of yielding material, having an enlarged end head, in combination with a coupling socket member adapted to receive and inclose said enlarged end head, and locking blocks adapted to enter the end of the coupling socket after the hose head is in place therein, said blocks and sockets having means for interengagement when the blocks are in place which require the blocks to be depressed in the yielding pipe to permit their insertion in the socket.

8. A hose pipe made up of an inner rubber portion and a fabric outer portion and in which the ends of the rubber portion extend beyond the fabric outer portion forming flexible expansible end flaps for the hose pipe, in combination with a coupling to which the hose pipe is secured and into which the flexible end flap of the rubber tube extends and against which said flap is free to seal when under pressure.

9. A hose pipe made up of an inner rubber portion and a fabric outer portion having an enlarged end and in which the end of the rubber portion extends beyond and lies against the end of its casing forming a flexible expansible end flap for the hose pipe, in combination with a coupling socket into which the enlarged head of the hose pipe is entered and against the inner wall of which the flexible end flap abuts and is free to seal under the pressure in the hose, and means secured to the outer end of the socket and abutting against the inner edge of the enlarged head.

10. A hose pipe made up of an inner rubber tube and a strengthening tubular jacket or casing having an enlarged ring braced by a stiffening end and in which the ends of the rubber tubes extend beyond and lie against the end of its casing forming flexible expansible end flaps for the hose pipe, in combination with a coupling socket into which the enlarged head of the hose pipe is entered and against the rear end of which the flexible flap abuts and means secured to the outer end of the socket and abutted against the inner edges of the enlarged head.

11. A hose pipe having an inner soft rubber tube surrounded by a fabric tube having an enlarged end head and incorporating a strengthening ring in the head outside of the soft rubber tube, in combination with a coupling socket adapted to receive and inclose the enlarged head of the hose, and means secured to the outer end of the socket abutting against the inner edge of the head.

12. A substantially non-metallic flexible hose consisting of an air-tight inner portion and a fabric outer portion, said outer portion having thickened end head portions each incorporating a metallic ring surrounding the inner portion.

EDWARD D. NELSON.
WILLIAM L. BROWN.

Witnesses:
S. S. METZ,
GEO. M. METZ.